(12) United States Patent
Largillier et al.

(10) Patent No.: US 8,123,465 B2
(45) Date of Patent: Feb. 28, 2012

(54) MOUNTING TUBES FOR PRESSURIZING AN INTERNAL ENCLOSURE IN A TURBOMACHINE

(75) Inventors: Christian Largillier, Villeneuve la Guyard (FR); Francois Marie Paul Marlin, Villiers Sous Grez (FR); Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 658 days.

(21) Appl. No.: 12/330,810

(22) Filed: Dec. 9, 2008

(65) Prior Publication Data

US 2009/0155052 A1 Jun. 18, 2009

(30) Foreign Application Priority Data

Dec. 14, 2007 (FR) ...................... 07 08711

(51) Int. Cl.
- *F01D 5/14* (2006.01)
- *F03D 11/00* (2006.01)
- *F04D 29/38* (2006.01)

(52) U.S. Cl. .................. 415/115; 415/173.5; 415/174.5; 416/204; 416/244

(58) Field of Classification Search .................. 415/115, 415/116, 170.1, 173.5, 174.5, 200; 416/204, 416/244, 97 R See application file for complete search history.

(56) References Cited

U.S. PATENT DOCUMENTS

| | | | | |
|---|---|---|---|---|
| 6,331,097 | B1 * | 12/2001 | Jendrix ........................ | 416/96 R |
| 6,960,060 | B2 * | 11/2005 | Lee ................................ | 415/115 |
| 6,981,841 | B2 * | 1/2006 | Krammer et al. ............. | 415/115 |
| 7,086,830 | B2 * | 8/2006 | Fitzgerald et al. ............ | 415/115 |
| 7,159,402 | B2 * | 1/2007 | Hein et al. ...................... | 60/785 |
| 7,926,289 | B2 * | 4/2011 | Lee et al. ......................... | 60/782 |
| 2004/0179936 | A1 | 9/2004 | Fitzgerald et al. | |
| 2007/0053770 | A1 | 3/2007 | Lammas et al. | |

FOREIGN PATENT DOCUMENTS

| EP | 1 750 012 A1 | 2/2007 |
|---|---|---|
| GB | 783970 | 10/1957 |

* cited by examiner

*Primary Examiner* — David Nhu

(74) *Attorney, Agent, or Firm* — Oblon, Spivak, McClelland, Maier & Neustadt, L.L.P.

(57) ABSTRACT

A turbomachine comprising high- and low-pressure compressor shafts guided in bearings isolated from an internal enclosure by a sealing end plate, and radial pressurization tubes connecting the enclosure to an air passage passing through the intermediate casing, the ends of these tubes being engaged in sealed manner in radial ducts of the intermediate casing and in radial chimneys of the sealing end plate, the chimneys being of a length is sufficient to enable the ends of the tubes to be moved in translation therein between a service position and a mounting position for the tubes.

10 Claims, 3 Drawing Sheets

MOUNTING TUBES FOR PRESSURIZING AN INTERNAL ENCLOSURE IN A TURBOMACHINE

CROSS-REFERENCE TO RELATED APPLICATIONS

This application claims the benefit of priority under 35 U.S.C. §119 from French Application 07/08711 filed Dec. 14, 2007. The entire contents of which are incorporated herein by reference.

FIELD OF THE INVENTION

The present invention relates to mounting tubes for pressurizing an internal enclosure in a turbomachine, such as an airplane turbojet or turboprop.

BACKGROUND OF THE INVENTION

A turbomachine comprises a low-pressure compressor and a high-pressure compressor each driven by a rotary shaft and interconnected by an intermediate casing that defines an annular flow passage for a primary air stream passing from the low-pressure compressor to the high-pressure compressor. A sealing annular end plate is carried by the intermediate casing and extends between bearings for guiding the compressor shafts. A radially inner end of the end plate has labyrinth seals co-operating with the downstream and upstream ends respectively of the low- and high-pressure compressor shafts. This end of the end plate also has radial chimneys in which tubes are mounted for pressurizing the internal enclosure, these tubes extending in radial ducts of the intermediate casing that open out into the primary air passage in order to be fed with air under pressure. This air under pressure prevents oil for lubricating the bearings that guide the compressor shafts from leaking out through the labyrinth seals.

In order to enable them to be mounted, the pressurization tubes are engaged in the radial chimneys of the annular end plate and then the end plate is fastened to the intermediate casing. The radially outer ends of the tubes are then engaged in their service position in the radial ducts of the intermediate casing. An annular collar incorporated in each tube serves to hold the tubes in this position by using an annular flange mounted around each tube and fastened by bolting to a corresponding flange on each of the radial ducts of the intermediate casing.

During this mounting operation, the sealing rings that are housed in grooves at the ends of the tubes need to be engaged in and extracted from the radial chimneys of the annular end plate several times, and that runs the risk of damaging them.

Furthermore, such mounting is possible only on turbomachines of large diameter, in which it is possible to move the tubes radially inwards in the radial chimneys of the end plate over a distance that is sufficient for the outer ends of the tubes to be well clear of the radial ducts of the intermediate casing and avoid interfering therewith while the end plate is being fastened to the intermediate casing.

In turbomachines of small diameter, the axial distance between the compressor shafts is small and the space that lies radially inside the radial chimneys of the end plate is generally occupied in part by bearing nuts carrying the labyrinth seals, thereby preventing the pressurization tubes being moved radially inwards as is required for mounting them.

OBJECT AND SUMMARY OF THE INVENTION

An object of the present invention is to solve this mounting problem in a manner that is simple, effective, and inexpensive.

To this end, the invention provides a turbomachine compressor module comprising a low-pressure compressor and a high-pressure compressor having shafts that are guided in bearings that are isolated from an internal enclosure containing the compressor shafts by labyrinth seals mounted on a sealing end plate carried by an intermediate casing, and radial tubes for pressurizing the internal enclosure, connecting said enclosure to a compressed air passage passing through the intermediate casing, the ends of these tubes being engaged in sealed manner in radial ducts of the intermediate casing and in radial chimneys of the sealing end plate, means being provided to hold the ends of the tubes stationary in the radial ducts of the intermediate casing, wherein the chimneys of the sealing end plate are of radial size or length that is sufficient to enable the radially inner ends of the tubes to be moved therein in translation between a service position in which the radially outer ends of the tubes are mounted in sealed manner in the ducts of the intermediate casing, and a mounting position in which the radially outer ends of the tubes are not in the ducts of the intermediate casing.

Thus, in the mounting position, the radially inner ends of the tubes remain inside the chimneys, thus enabling pressurization tubes to be mounted in turbomachines of small diameter.

In addition, mounting tubes in this way avoids the sealing rings mounted at the radially inner ends of the tubes being moved into and then out from the radial chimneys several times.

According to another characteristic of the invention, the radial chimneys of the sealing end plate include means that limit the movement in translation of the ends of the tubes towards the axis of the turbomachine. This prevents the sealing rings at the inner ends of the tubes from being moved out from the radial chimneys, and a mounting position is defined in positive manner for each of the tubes.

Advantageously, each radial chimney of the end plate includes at its radially inner end a narrowing that prevents the end of a tube from passing through.

The radially outer ends of the chimneys of the sealing end plate include respective chamfers, thus facilitating insertion of the radially inner ends of the tubes together with their sealing rings into the chimneys of the end plate.

The invention also provides an end plate for sealing an internal enclosure of a compressor module of the above-described type, wherein the end plate has radial chimneys for mounting tubes for pressurizing the internal enclosure and wherein the radially inner end of each chimney includes a narrowing.

BRIEF DESCRIPTION OF THE DRAWINGS

Other advantages and characteristics of the invention appear on reading the following description made by way of non-limiting example and with reference to the accompanying drawings, in which.

MORE DETAILED DESCRIPTION

Figure 1:
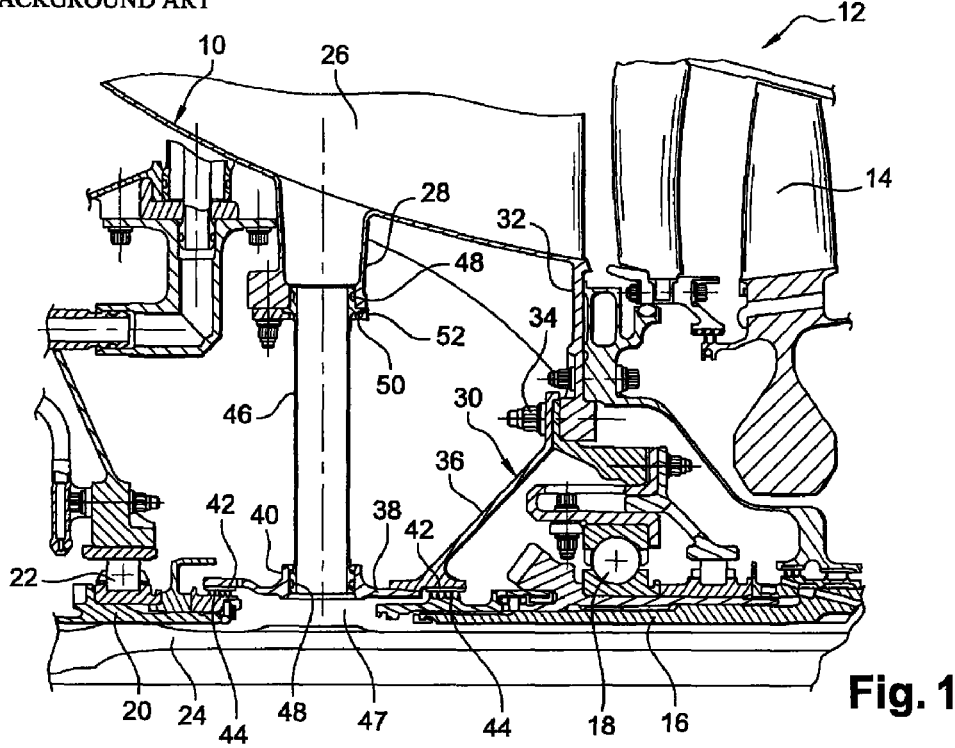
FIG. 1 is a fragmentary diagrammatic half-view in axial section of a turbomachine of the prior art, showing a tube for pressurizing the internal enclosure, in its service position.
Figure 2:
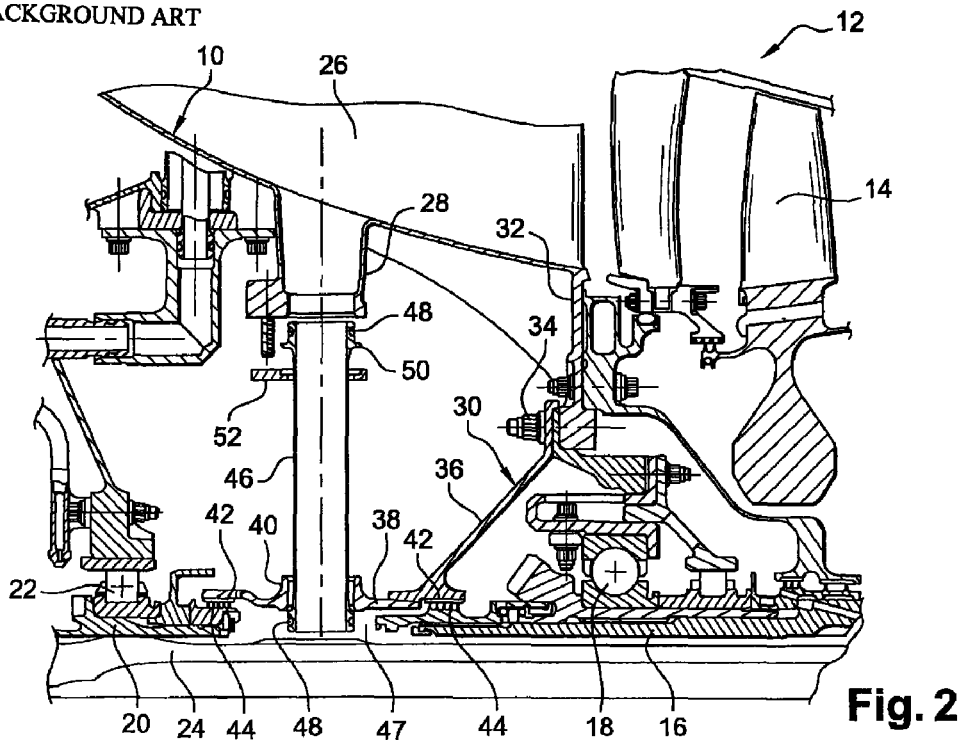
FIG. 2 is a diagrammatic view corresponding to FIG. 1 and showing the pressurization tube in its mounting position.

Reference is made initially to FIGS. 1 and 2 that show a turbomachine of the prior art in which an intermediate casing 10 is arranged between an upstream low-pressure compressor (not shown) and a downstream high-pressure compressor 12. The rotor 14 of the high-pressure compressor is driven in rotation by a shaft 16 that is carried and guided at its upstream end by a ball bearing 18 and that is driven by the shaft of a high pressure turbine that is arranged downstream (not shown). In similar manner, the rotor of the low-pressure compressor is driven in rotation by a shaft 20 that is carried and guided by a ball bearing 22 and that is driven by a shaft 24 of a low pressure turbine arranged downstream from the high pressure turbine.

The intermediate casing 10 defines a flow passage 26 for a primary air stream passing from the low-pressure compressor to the high-pressure compressor 12 and it includes tubular cylindrical projections 28 that extend radially inwards. An annular end plate 30 is fastened at its downstream end to a flange 32 of the intermediate casing 10 by a screw-and-nut fastener system 34 and that co-operates at is upstream end with the downstream and upstream ends respectively of the low- and high-pressure compressor shafts 20 and 16. The end plate 30 has a frustoconical wall 36 of section diameter that tapers upstream, connected at its upstream end to a substantially cylindrical wall 38 including outwardly extending radial chimneys 40. The cylindrical wall 38 has abradable elements 42 at its upstream and downstream ends for co-operating with labyrinth seals 44 carried by the upstream and downstream ends respectively of the high- and low-pressure compressor shafts 16 and 20.

Pressurization tubes 46 are mounted in the chimneys 40 and in the ducts formed by the radial projections 28 of the intermediate casing 10, the ends of the tubes 46 having annular grooves that receive sealing rings 48.

In operation, air is taken from the air passing along the primary passage 26 by the tubes 46 in order to pressurize the internal enclosure 47 situated between the shafts of the compressors and the shaft 24 of the low-pressure turbine, so as to avoid lubricating oil leaking from the bearings 18 and 20 into said enclosure by the labyrinth seals 44.

As shown in FIG. 2, the pressurization tubes are inserted from the outside into the chimneys 40 of the end plate 30 until their radially inner ends come level with the ends of the compressor shafts 16 and 20. In this way, the radially outer ends of the tubes 46 remain outside the ducts 28 of the intermediate casing 10. The tubes 46 are then moved radially outwards so that their radially outer ends engage in the radial ducts 28. Each tube 46 is held in its service position by an annular collar 50 at its outer end that is applied against a rim of the duct 28 by a flange 52 fastened to the intermediate casing 10 by screws or bolts.

Nevertheless, mounting can be performed in this way only with large engines in which the axial space between the ends of the high- and low-pressure compressor shafts 16 and 20 is sufficient to allow the tubes 46 to be moved into a mounting position. In addition, the sealing rings 48 of the radially inner ends of the tubes 46 need to be inserted twice in the chimneys 40, a first time when mounting the tubes 46 on the end plate 30, and then a second time when engaging the tubes 46 in the ducts 28 of the intermediate casing 10, thereby increasing the risk of damaging them.

Figure 3:
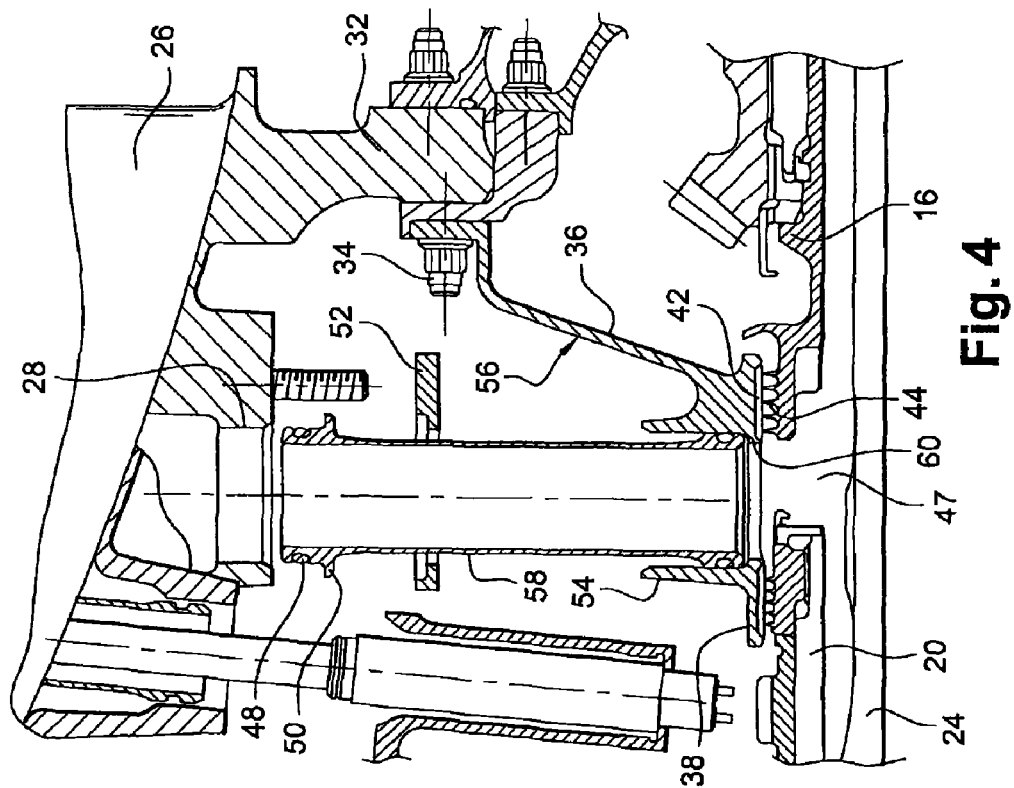
FIG. 3 is a fragmentary diagrammatic half-view in axial section of a turbomachine of the invention, showing a tube for pressurizing the internal enclosure in its service position.
Figure 4:
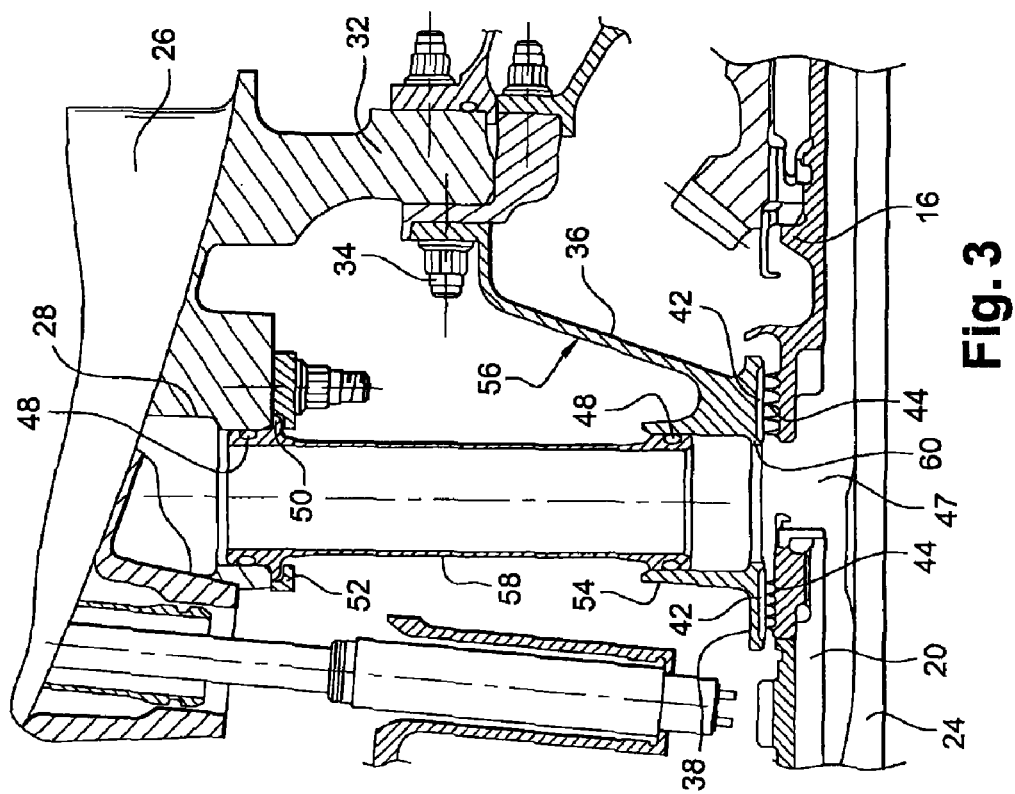
FIG. 4 is a diagrammatic view corresponding to FIG. 3 and showing the pressurization tube in its mounting position.

In the invention and as shown in FIGS. 3 and 4, these drawbacks are avoided by the fact that the chimneys 54 in the sealing end plate 56 present a radial size or length that is sufficient for the radially inner ends of the pressurization tubes 58 to be movable therein in translation between their service positions and their mounting positions, thereby enabling the sealing rings 48 at the radially inner ends of the tubes 58 to be inserted once only into the chimneys 54 of the end plate 56.

In practice, the radial size of the chimneys 54 of the end plate 56 is increased and the length of the tubes 58 is decreased, compared with the prior art.

The radial chimneys 54 of the end plate 56 include means for limiting movement in translation of the tubes 58 towards the compressor shafts. These means comprise a narrowing in the inside diameter of the chimneys, formed by an annular rim 60 placed at the radially inner end of each chimney 54. The rim 60 thus serves as an abutment in translation for the tubes 58 and can be situated radially further outwards within the chimney. Under such circumstances, it is necessary to increase the radial size or length of the chimneys 54 and to reduce the length of the tubes 58 so that it is still possible for the tubes to be mounted.

The radially outer ends of the chimneys 54 of the end plate 56 include chamfers to facilitate inserting the tubes 58 in the chimneys 54 and to avoid damaging the sealing rings 48.

Figure 5:
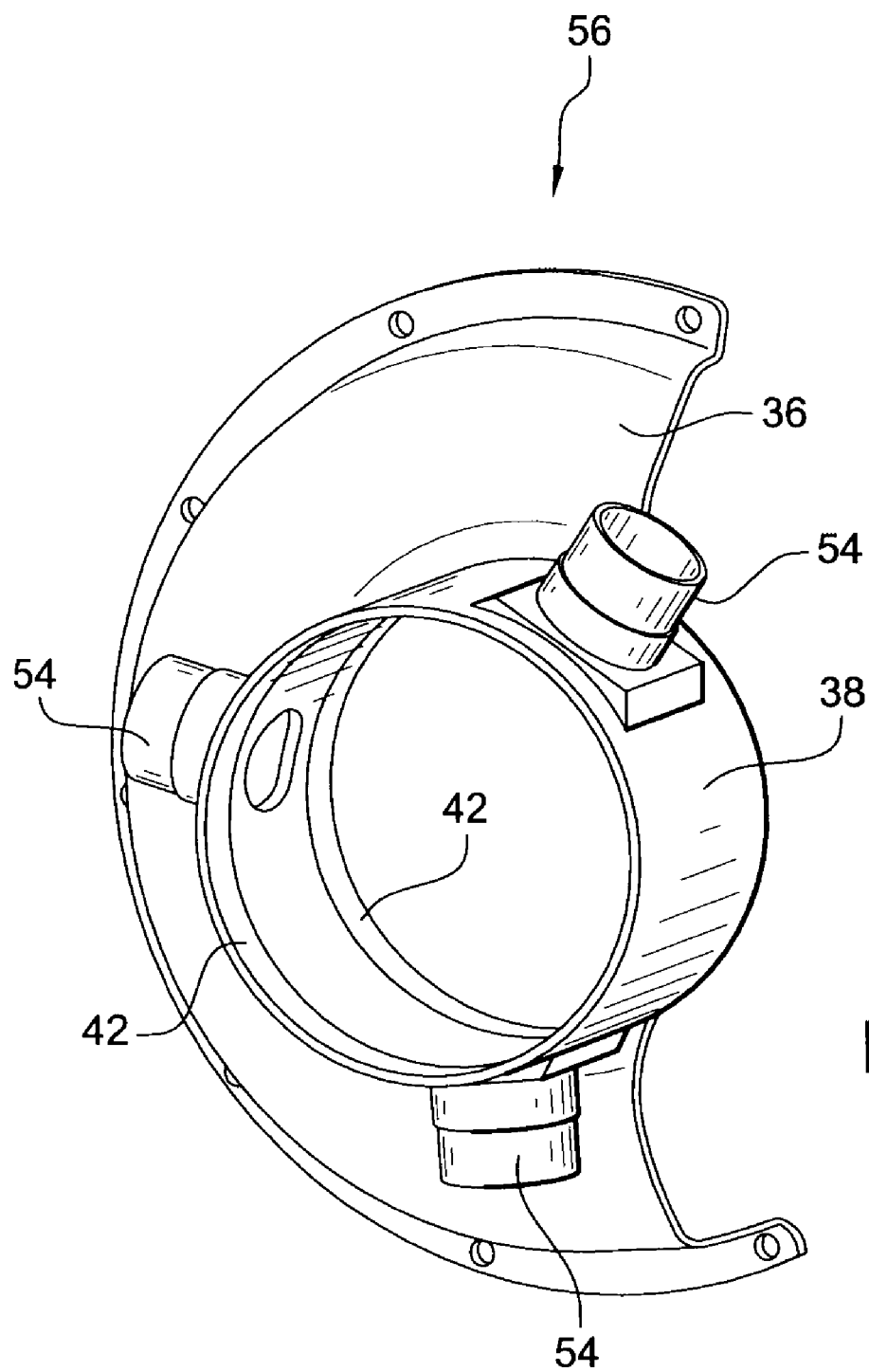
FIG. 5 is a fragmentary diagrammatic view in perspective of an annular end plate of the invention.

FIG. 5 shows an end plate 56 of the invention that has three chimneys. The end plate 56 may have a larger number of chimneys depending on the specific pressurization requirements and on the space available.

Although the invention is particularly applicable to turbomachines of small diameter, it is also applicable to turbomachines of larger diameter.

What is claimed is:

1. A turbomachine compressor module comprising:
a low-pressure compressor and a high-pressure compressor having shafts that are guided in bearings that are isolated from an internal enclosure containing the compressor shafts by labyrinth seals mounted on a sealing end plate carried by an intermediate casing; and
radial tubes for pressurizing the internal enclosure, connecting said enclosure to a compressed air passage passing through the intermediate casing, the ends of these radial tubes being engaged in sealed manner in radial ducts of the intermediate casing and in radial chimneys of the sealing end plate, means being provided to hold the ends of the radial tubes stationary in the radial ducts of the intermediate casing,
wherein the radial chimneys of the sealing end plate are of radial size or length that is sufficient to enable the radially inner ends of the radial tubes to be moved therein in translation between a service position in which the radially outer ends of the radial tubes are mounted in sealed manner in the radial ducts of the intermediate casing, and a mounting position in which the radially outer ends of the radial tubes are not in the radial ducts of the intermediate casing.

2. The turbomachine compressor module according to claim 1, wherein the radial chimneys of the sealing end plate include means that limit the movement in translation of the ends of the radial tubes towards the axis of the turbomachine.

3. The turbomachine compressor module according to claim 2, wherein each radial chimney of the sealing end plate includes at its radially inner end a narrowing that prevents the end of a tube from passing through.

4. The turbomachine compressor module according to claim 3, wherein the narrowing in each radial chimney of the sealing end plate defines the mounting position of the tube.

5. The turbomachine compressor module according to claim 1, wherein the ends of the radial tubes carry sealing rings that are movable in sliding within the radial ducts of the intermediate casing and within the radial chimneys of the sealing end plate.

6. The turbomachine compressor module according to claim 5, wherein the radially outer ends of the chimneys of the sealing end plate include respective chamfers.

7. The turbomachine compressor module according to claim 1, wherein the radially outer ends of the radial tubes include respective annular collars for bearing against the ends of the radial ducts of the intermediate casing in the service position of the radial tubes and held in this position by means of annular flanges fastened to the intermediate casing around the radial tubes.

8. An end plate for sealing an internal enclosure of the turbomachine compressor module according to claim 1,
   wherein the end plate includes radial chimneys for mounting tubes for pressurizing the internal enclosure, and
   wherein the radially inner ends of the radial chimneys include respective narrowings.

9. A turbomachine, comprising a turbomachine compressor module according to claim 1.

10. The turbomachine of claim 9, wherein the turbomachine is an airplane turboprop or turbojet.

\* \* \* \* \*